(12) United States Patent
Park et al.

(10) Patent No.: US 9,581,688 B2
(45) Date of Patent: Feb. 28, 2017

(54) PULSE RADAR APPARATUS

(71) Applicant: ELECTRONICS AND TELECOMMUNICATIONS RESEARCH INSTITUTE, Daejeon (KR)

(72) Inventors: Pil-Jae Park, Daejeon (KR); Cheon-Soo Kim, Daejeon (KR); Seong-Do Kim, Daejeon (KR); Sung-Chul Woo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 362 days.

(21) Appl. No.: 14/268,492

(22) Filed: May 2, 2014

(65) Prior Publication Data

US 2014/0354469 A1 Dec. 4, 2014

(30) Foreign Application Priority Data

May 28, 2013 (KR) .................. 10-2013-0060190

(51) Int. Cl.
*G01S 13/18* (2006.01)
*G01S 13/10* (2006.01)
(Continued)

(52) U.S. Cl.
CPC .............. *G01S 13/103* (2013.01); *G01S 7/28* (2013.01); *G01S 13/0209* (2013.01)

(58) Field of Classification Search
CPC ....... G01S 13/0209; G01S 13/103; G01S 7/28
(Continued)

(56) References Cited

U.S. PATENT DOCUMENTS 5,805,110 A * 9/1998 McEwan .................. G01C 3/08
342/126
6,137,438 A * 10/2000 McEwan ............... G01S 7/2922
342/118
(Continued)

FOREIGN PATENT DOCUMENTS

JP 2006-311486 A 11/2006
JP 4457074 B2 4/2010
(Continued)

OTHER PUBLICATIONS

Ta-Shun Chu et al., "A Short-Range UWB Impulse-Radio CMOS Sensor for Human Feature Detection" 2011 IEEE International Solid-State Circuits Conference Digest of Technical Papers (ISSCC), pp. 294-296, Feb. 20-24, 2011.
(Continued)

*Primary Examiner* — Marcus Windrich
(74) *Attorney, Agent, or Firm* — Rabin & Berdo, P.C.

(57) ABSTRACT

A pulse radar apparatus is disclosed. The pulse radar apparatus includes a pulse generation unit, a receiver unit, a synchronization unit, and a switch unit. The pulse generation unit generates a pulse based on a transmission trigger signal having a transmission pulse repetition period, and sends the pulse to a target via a transmission antenna. The synchronization unit generates the transmission trigger signal using an external reference clock, provides the transmission trigger signal to the pulse generation unit, and generates a plurality of clock signals having a time delay with respect to the transmission pulse trigger signal using the external reference clock. The switch unit selects any one clock signal from the plurality of clock signals in response to an external selection signal, and provides the selected clock signal to a receiver unit which utilizes a sampler with provided sampling clocks.

13 Claims, 5 Drawing Sheets

(51) Int. Cl.
*G01S 7/28* (2006.01)
*G01S 13/02* (2006.01)

(58) Field of Classification Search
USPC .................................... 342/22, 195, 202
See application file for complete search history.

(56) References Cited

U.S. PATENT DOCUMENTS

| | | | | |
|---|---|---|---|---|
| 6,191,724 | B1* | 2/2001 | McEwan | G01S 7/35 342/118 |
| 6,836,165 | B2* | 12/2004 | Goto | G06F 1/04 327/141 |
| 7,221,724 | B2* | 5/2007 | Schell | H03K 5/15013 327/105 |
| 7,675,459 | B2 | 3/2010 | Yoshimura | |
| 7,940,841 | B2 | 5/2011 | Mimura et al. | |
| 8,000,406 | B2* | 8/2011 | Stoica | H03L 7/0812 327/141 |
| 8,754,806 | B2 | 6/2014 | Park et al. | |
| 2005/0111602 | A1 | 5/2005 | Suda et al. | |
| 2010/0036211 | A1* | 2/2010 | La Rue | A61B 5/0002 600/301 |
| 2010/0302885 | A1* | 12/2010 | Rhee | G11C 7/22 365/194 |
| 2011/0084880 | A1* | 4/2011 | Sakai | G01S 7/282 342/375 |
| 2012/0148002 | A1* | 6/2012 | Kim | G01S 7/2921 375/371 |
| 2013/0241766 | A1* | 9/2013 | Kishigami | G01S 7/023 342/159 |

FOREIGN PATENT DOCUMENTS

| | | |
|---|---|---|
| JP | 2010-216980 A | 9/2010 |
| KR | 10-2006-0125093 A | 12/2006 |
| KR | 10-2012-0064532 A | 6/2012 |
| KR | 2012-0066307 A | 6/2012 |
| WO | WO 2008014106 A2 * | 1/2008 ............ H04N 3/155 |

OTHER PUBLICATIONS

Anh Tuan Phan et al., "Low-Power Sliding Correlation CMOS UWB Pulsed Radar Receiver for Motion Detection" IEEE International Symposium on Circuits and Systems, 2009, pp. 1541-1544, May 24-27, 2009.

* cited by examiner

PULSE RADAR APPARATUS

CROSS REFERENCE TO RELATED APPLICATION

This application claims the benefit of Korean Patent Application No. 10-2013-0060190, filed on May 28, 2013, which is hereby incorporated by reference in its entirety into this application.

BACKGROUND OF THE INVENTION

1. Technical Field

The present invention relates generally to a pulse radar apparatus and, more particularly, to a pulse radar apparatus that is capable of receiving an echo signal returned from a target.

2. Description of the Related Art

A pulse radar sends transmission pulses at a pulse repetition frequency (PRF), and obtains information about a target by receiving an echo signal returned from the target and by analyzing the echo signal.

A conventional pulse radar receiver has a limitation to acquire high resolution because whether or not a pulse is present is determined based on a single transmission pulse and thus distance resolution is determined by pulse width. Although, among conventional pulse radar reception schemes, there is a scheme for increasing the Signal to Noise Ratio (SNR) of a received pulse by receiving a plurality of transmission pulses, this scheme also has a limitation to obtain high resolution.

In a conventional range gating method, delay is varied by disposing a delay element in the receiver of a radar, so that whether or not a target is present within a specific range is determined and then a range can be swept. However, this conventional range gating method has a limitation in the improvement of the resolution of a range that is determined by a pulse width.

As a related technology, U.S. Pat. No. 5,805,110 entitled "Impulse Radar with Swept Range Gate" discloses a structure in which a specific range can be variably determined.

In the technology disclosed in U.S. Pat. No. 5,805,110, a receiver is operated by delaying the signal of a pulse generator and inputting the delayed signal to a range gate, and thus the receiver is operated as a variable range receiver.

As another related technology, U.S. Pat. No. 7,675,459 entitled "Equivalent Time Sampling Radar" discloses a technology in which a reference signal is dithered using a noise signal and input pulses are sampled using the dithered signal, together with a sweep signal generator.

In the technology disclosed in U.S. Pat. No. 7,675,459, transmission pulses are generated using a signal obtained by dithering a reference clock, sampling pulses are generated using a sweep signal generator and a transmission dithering signal, and a signal received from a target is received by a sampling and hold circuit.

SUMMARY OF THE INVENTION

Accordingly, the present invention has been made keeping in mind the above problems occurring in the conventional art, and an object of the present invention is to provide a pulse radar apparatus having high resolution.

In accordance with an aspect of the present invention, there is provided a pulse radar apparatus, including a pulse generation unit configured to generate a pulse based on a transmission trigger signal having a transmission pulse repetition period, and to send the pulse to a target via a transmission antenna; a synchronization unit configured to generate the transmission trigger signal using an external reference clock, to provide the transmission trigger signal to the pulse generation unit, and to generate a plurality of clock signals having a time delay with respect to the transmission pulse trigger signal using the external reference clock; and a switch unit configured to select any one clock signal from the plurality of clock signals in response to an external selection signal, and to provide the selected clock signal to a sampler of a receiver for radar reception.

The plurality of clock signals generated from the synchronization unit may be clock signals obtained by dividing the transmission pulse repetition period at a certain time interval.

The synchronization unit may include a Delay-Locked Loop (DLL) unit having a multi-stage structure in which two or more DLL circuits are connected.

The DLL circuits of the multi-stage structure may be configured such that a preceding stage applies a plurality of clocks having a time interval to a subsequent stage and the subsequent stage outputs clocks by dividing the plurality of clocks.

The DLL circuits of the multi-stage structure may be driven in response to sequential startup signals.

The DLL circuits of the multi-stage structure may be configured such that the DLL circuit of a subsequent stage is driven in response to a signal indicative that the DLL circuit of a preceding stage has been locked.

The pulse radar apparatus may further include a delay element configured to delay the transmission trigger signal and to send the delayed transmission trigger signal to the pulse generation unit.

In accordance with an aspect of the present invention, there is provided a pulse radar apparatus, including a gain stage configured to receive an echo signal that has a pulse repetition period and is reflected from targets, and to amplify the received echo signal; a sampler configured to hold the echo signal, having passed through the gain stage, using a sampling clock obtained by dividing the pulse repetition period, and to store the held echo signal in a hold device; and an analog-to-digital converter configured to convert the held echo signal into a digital signal, and to output the digital signal, wherein the sampling clock is provided by a synchronization unit including DLL circuits.

The sampling clock may be selected from plurality of clocks, generated by the DLL circuits, to have a time delay with respect to the pulse trigger signal.

The gain stage may include a low noise amplifier.

The hold device may include a capacitor.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
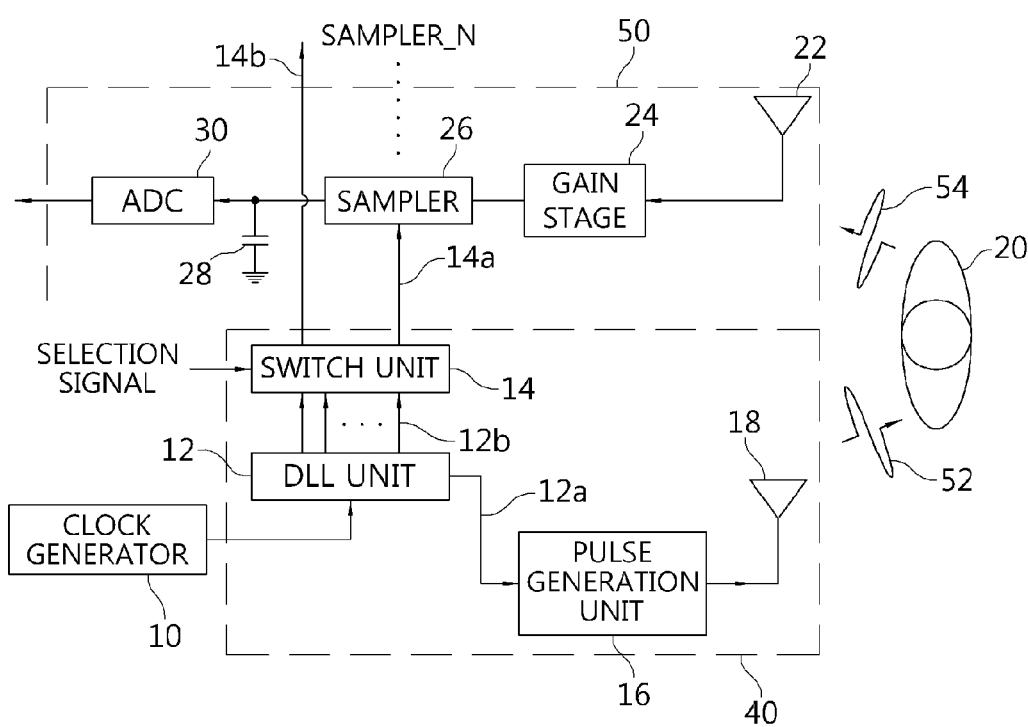
FIG. 1 is a diagram illustrating the configuration of a pulse radar apparatus according to an embodiment of the present invention.

A pulse radar apparatus according to embodiments of the present invention is described below with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the embodiments and the configurations at the time at which the present application is filed.

FIG. 1 is a diagram illustrating the configuration of a pulse radar apparatus according to an embodiment of the present invention.

The pulse radar apparatus according to this embodiment of the present invention includes a transmitter 40 and a receiver unit 50.

The transmitter 40 includes a Delay-Locked Loop (DLL) unit 12, a switch unit 14, a pulse generation unit 16, and a transmission antenna 18.

The pulse generation unit 16 generates pulses in response to a transmission trigger signal 12a from the DLL unit 12. The pulses generated by the pulse generation unit 16 are transmitted to a target 20 via the transmission antenna 18. The transmission trigger signal has a specific transmission pulse repetition period. The transmission pulse repetition period may mean the repetition period of any one pulse when the pulse is sent. In general, a pulse is periodically repeated at specific intervals. In this case, the number of repetitions (i.e., the number of pulses) per second is referred to as a repetition frequency. Accordingly, a transmission pulse repetition frequency may be the number of transmission pulses generated per second. If the period between two pulses (i.e., a repetition period) is T[sec], a repetition frequency f is f=1/T [Hz]. As described above, a repetition frequency is the reciprocal of a repetition period. In FIG. 1, reference numeral 52 may designate transmission pulses.

The DLL unit 12 receives a reference clock (having a transmission repetition frequency, or fraction of the transmission repetition frequency) output by a clock generator 10. The DLL unit 12 generates a transmission trigger signal based on the reference clock from the clock generator 10, and provides the transmission trigger signal 12a to the pulse generation unit 16. In order to generate a sampling clock, the DLL unit 12 may generate a plurality of clock signals having a transmission repetition frequency (i.e., a clock signal having multiple phases) based on the reference clock from the clock generator 10. In FIG. 1, reference numeral 12a may designate the transmission trigger signal, and reference numeral 12b may designate the plurality of clock signals. For example, at the rising edge of the transmission trigger signal, the pulse generation unit 16 generates a pulse. The DLL unit 12 may be an example of a synchronization unit that is described in the claims of the present invention. The internal configuration of the DLL unit 12 is described later.

The switch unit 14 selects any one clock signal among a plurality of clock signals in response to an external selection signal, and provides the clock signal to the sampler 26 of the receiver unit 50 as a sampling clock 14a. The sampling clock 14a and the transmission trigger signal can be configured to have a specific time delay for an echo signal reception because the echo signal 54 is a reflected pulse of the transmission pulse 52 after a certain time delay. The sampling clock 14a is used to sample the echo signal 54.

In this case, the DLL unit 12 and the switch unit 14 may be collectively called a clock generation unit configured to generate a sampling clock and transmission trigger signal. That is, this clock generation unit receives the reference clock having a transmission repetition frequency from the clock generator 10 and the external selection signal from the outside. The selection signal may be input by a user. The clock generation unit generates the transmission trigger signal based on the reference clock from the clock generator 10, sends the transmission trigger signal to the pulse generation unit 16, generates the sampling clocks 14a having a specific time delay from the transmission trigger signal 12a.

The receiver unit 50 includes a reception antenna 22, a gain stage 24, the sampler 26, and an Analog-to-Digital Converter (ADC) 30.

The receiver unit 50 may receive the reflected echo signal 54 returned from the target 20. The reception antenna 22 receives the returned echo signal (having a pulse repetition period.

The gain stage 24 amplifies the echo signal received by the reception antenna 22. The gain stage 24 may amplify the echo signal using a low noise amplifier (LNA) capable of lowering the noise factor of the entire receiver.

The sampler 26 holds the echo signal having passed through the gain stage 24 using the sampling clock obtained by dividing the pulse repetition period, and stores the echo signal in a hold device 28. The hold device 28 may include a capacitor.

The ADC 30 converts the signal (i.e., a signal having an analog component) stored in the hold device 28 into a signal having a digital component, and outputs the digital signal.

In accordance with the pulse radar apparatus according to this embodiment of the present invention, which is configured as described above, the pulse generation unit 16 of the transmitter 40 generates pulses in response to a transmission trigger signal of the DLL unit 12, and sends the transmission pulses 52 to the target 20 via the transmission antenna 18. Accordingly, the transmission pulses 52 hit the target 20, and are reflected from the target 20. In this case, a signal reflected from the target 20 is called the echo signal 54.

The receiver 50 receives the echo signal 54 by sampling at a narrow time delay, and obtains information about the position and displacement of the target 20 from the received echo signal 54. That is, the echo signal 54 received by the reception antenna 22 of the receiver 50 is sent to the sampler 26 via the gain stage 24. In this case, the sampler 26 receives the sampling clock 14a from the synchronization unit in the transmitter 40, rapidly holds an input signal (i.e., a signal received from the gain stage 24) at the time of sampling clock rising edge, and stores the results of the reception in the hold device 28 (e.g., a capacitor) in a voltage form. The hold signal is converted into a signal in a digital domain via the ADC 30, and is then subject to signal processing in a digital domain.

In this case, the receiver 50 may construct a second reception channel by inputting another sampling clock 14b selected to have a specific time delay and an input signal received from the gain stage 24 to another sampler (i.e., sampler_n). Alternatively, a reception channel may be extended by increasing the number of sampling clocks and the sampler.

In other words, in this embodiment of the present invention, in order to receive echo signals returned from the target 20, a sampling clock is delayed to a specific point of time after the transmission pulse 52 has been generated. Accordingly, an accurate distance to the target and a range in which the target is located can be selected.

Figure 2:
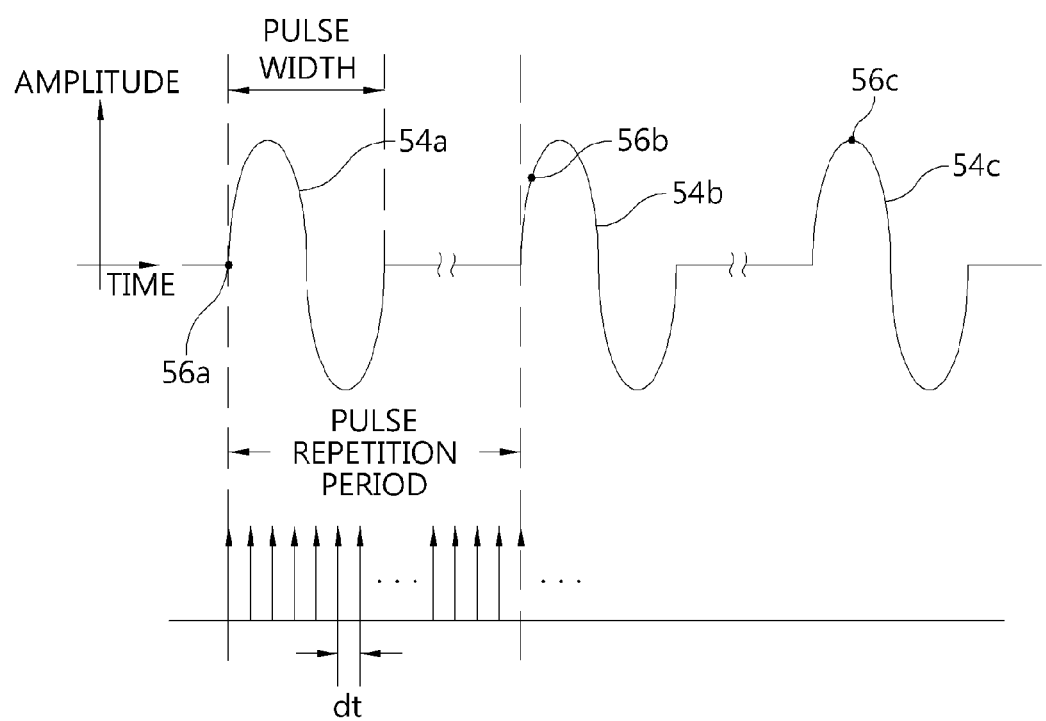
FIG. 2 is a diagram illustrating a principle by which an echo signal is received based on a plurality of transmission pulses using a pulse radar apparatus according to an embodiment of the present invention.

FIG. 2 is a diagram illustrating a principle by which an echo signal is received based on a plurality of transmission pulses using a pulse radar apparatus according to an embodiment of the present invention.

The pulse 52 generated by the pulse generation unit 16 is repeatedly transmitted, the pulse 52 is reflected from the target 20 at a specific distance, the amplitude of the pulse 52 is attenuated, and then the pulse 52 returns to the reception antenna 22. Signals that have arrived at the reception antenna 22 are called echo signals 54a, 54b, and 54c. The echo signals 54a, 54b and 54c are amplified by the gain stage 24 of the receiver 50, and are input to the sampler 26. In this case, an echo signal (e.g., 54a) that is reflected from the fixed target 20 and then passes through the reception antenna 22 and the gain stage 24 has a pulse repetition period. Although an echo signal with sufficient SNR is considered for convenience of description of an operating principle, the generality of the description of the operating principle is also valid for the noisy echo signals. The sampling clocks of the receiver 50 can be considered as the DLL unit 12 generated signal, and the signal can be obtained by dividing the transmission repetition period by a small time interval dt. In this case, the switch unit 14 selects a specific clock from the DLL unit generated signals, and the selected clock is used as the sampling clock 14a of the sampler 26. Accordingly, if the sampling clock 14a is selected in each pulse repetition period so that it has a specific time interval and used as the sampling clock 14a of the sampler 26, some or all of echo signals may be restored from the plurality of echo signals.

In FIG. 2, the part of echo signal has been restored by collecting sampled signals (i.e., signals sampled at 56a, 56b and 56c). It has been assumed that in the case of a moving target, there is no difference among a plurality of received echo signals because the time it takes to receive signals in a single pulse repetition period is sufficiently short. For example, if an echo signal having a pulse repetition frequency of 10 MHz (i.e., a period of 100 nsec) is received at a resolution of 1 cm (33.3 psec) from a target that moves at a speed of 1 m per second, about 3000 (100 n/33.3 psec) echo signals are required to restore pulses for a single period. The target moves by 0.3 mm during this period (i.e., 100 n×3000=300 micro seconds). Accordingly, since the distance over which the target has moved is considerably smaller (1/30) than the intended resolution, it indicates that the pulse radar apparatus according to this embodiment of the present invention can operate desirably.

Figure 3:
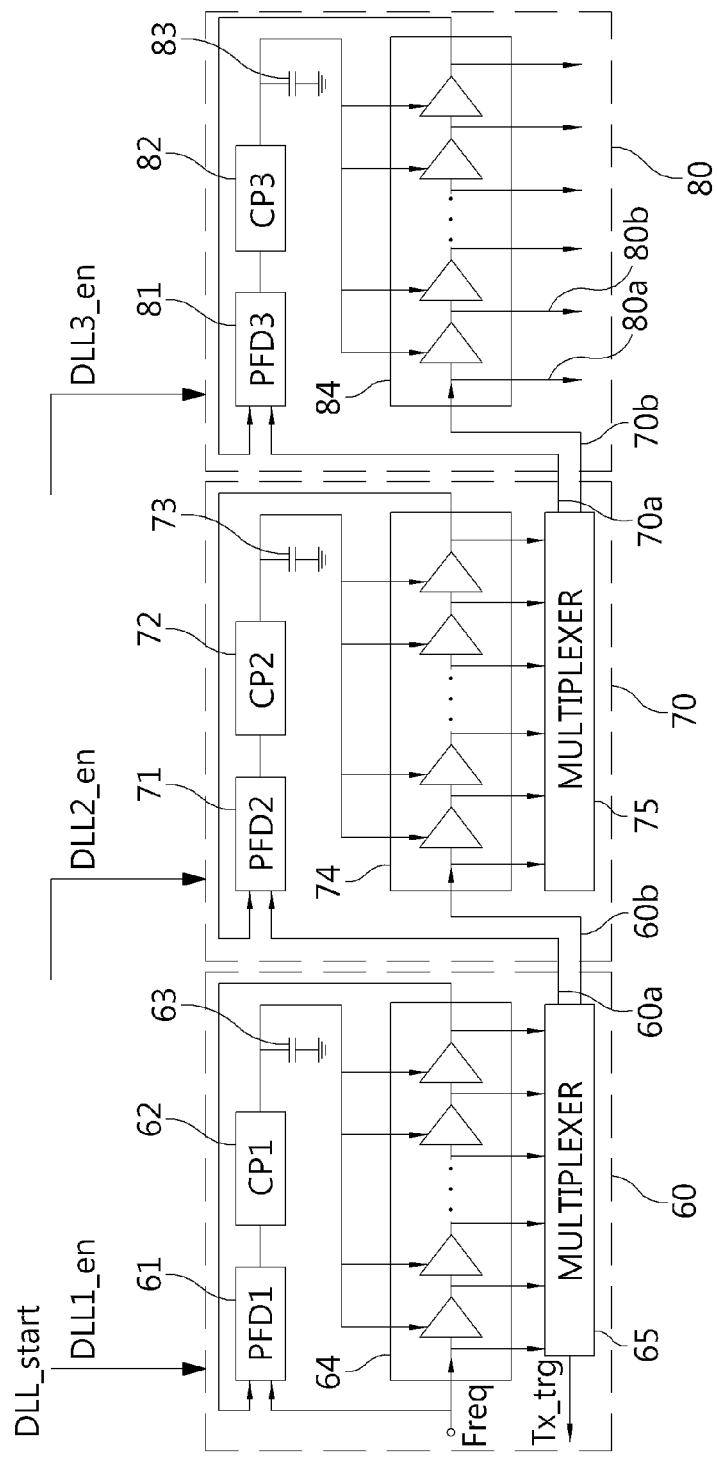
FIG. 3 is a diagram illustrating an example of the internal configuration of a DLL unit illustrated in FIG. 1.

FIG. 3 is a diagram illustrating an example of the internal configuration of the DLL unit 12 illustrated in FIG. 1. In an embodiment of the present invention, the DLL unit 12 is assumed to have a 3-stage structure, but the present invention is not limited thereto. The number of stages of the DLL unit 12 may be reduced or increased if necessary.

The DLL unit 12 functions to generate a clock signal having a specific time delay with respect to the repetition period of a transmission trigger signal and to provide the clock signal to the sampler 26 of the receiver 50 via switch unit 14 as a sampling clock.

In FIG. 3, the DLL unit 12 is illustrated as including a first DLL unit 60, a second DLL unit 70, and a third DLL unit 80. Each DLL units 60, 70 and 80 forms a feedback loop, and provide multiple phases obtained by dividing an input clock period using a voltage-controlled delay line (VCDL). Each DLL units 60, 70 and 80 may be enabled by signals DLL1_en, DLL2_en and DLL3_en respectively.

The first DLL unit 60 includes a phase frequency detector (PFD) 61 or a phase detector (PD) configured to output voltage proportional to the phase difference between two input signals, a charge pump (CP) 62 configured to convert the output signal of the PFD 61 into the correspond current and provide the voltage information at a capacitor, that is, a loop filter 63, a VCDL 64 configured to generate a clock having multiple phases from the input clock Freq (i.e., the reference clock of the clock generator 10) based on voltage output by the loop filter 63, and a multiplexer 65 configured to select a transmission trigger signal Tx_trg among the multiple phases generated by the VCDL 64 and output the transmission trigger signal Tx_trg. The multiplexer 65 may receive the reference clock of the clock generator 10 as the input signal Freq, and may output signals 60a and 60b having a time interval of DT.

Like the first DLL unit 60, the second DLL unit 70 includes a PFD 71, a CP 72, a loop filter 73, a VCDL 74, and a multiplexer 75. The second DLL unit 70 selects output signals 70a and 70b having an interval dt among multi-phase outputs obtained by dividing the interval DT of the input signals 60a and 60b using the multiplexer 75, and outputs the selected output signals 70a and 70b.

Like the second DLL unit 70, the third DLL unit 80 includes a PFD 81, a CP 82, a loop filter 83, and a VCDL 84. The third DLL unit 80 receives the output signals 70a and 70b having the time interval dt from the second DLL unit 70, and outputs clocks 80a, 80b, . . . obtained by dividing the output signals 70a and 70b by a specific time interval. These clocks 80a, 80b, . . . may correspond to the clock (12b in FIG. 1) applied to the switch unit 14. As described above, the third DLL unit 80 generates clock signals obtained by dividing the time interval dt by a specific time interval, and thus multiple channels may be received at the same time by using multiple clock signals.

Since the DLL unit 12 employs the DLL circuits having a multi-stage structure, a preceding stage applies a plurality of clocks having a time interval to a subsequent stage and the subsequent stage outputs clocks obtained by the division of the provided clock time interval. In other words, the DLL unit 12 in which the DLL circuits has a multi-stage structure, are used determines a point of time via switch unit at which an echo signal is sampled, and determines a reception distance based on the point of time. Furthermore, the SNR of the receiver can be increased by repeatedly selecting clocks (i.e., receiving clocks having the same reception distance) for the same receive range.

Figure 4:
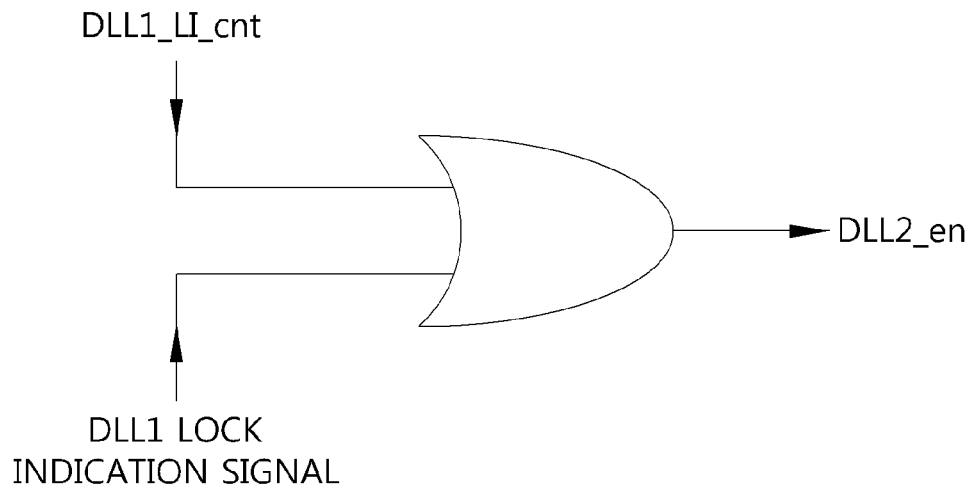
FIG. 4 is a diagram illustrating an example of a circuit configured to enable a second DLL unit, which is illustrated in FIG. 3.
Figure 5:
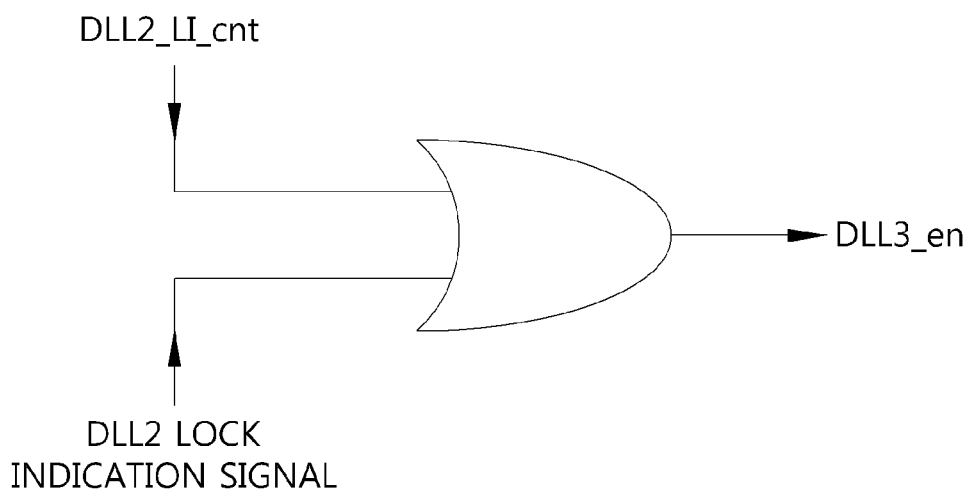
FIG. 5 is a diagram illustrating an example of a circuit configured to enable a third DLL unit, which is illustrated in FIG. 3.

FIG. 4 is a diagram illustrating an example of a circuit configured to enable the second DLL unit, which is illustrated in FIG. 3, and FIG. 5 is a diagram illustrating an example of a circuit configured to enable the third DLL unit, which is illustrated in FIG. 3.

When a DLL startup signal DLL_start is input to the first DLL unit 60, the first DLL unit 60 is enabled (or starts up).

In order to lock the DLL circuits having a multi-stage structure, the second DLL unit 70 may be enabled in response to an external startup signal DLL1_LI_cnt that is received after the first DLL unit 60 has been enabled, and the third DLL unit 80 may be enabled in response to an external startup signal DLL2_LI_cnt that is received after the second DLL unit 70 has been enabled. Alternatively, the DLL circuits of the multi-stage structure may be sequentially driven in such a manner that the second DLL unit 70 starts up in response to a signal indicating that the first DLL unit 60 has been locked (i.e., a DLL1 lock indication signal) and the third DLL unit 80 starts up in response to a signal indicating that the second DLL unit 70 has been locked (i.e., a DLL2 lock indication signal).

Figure 6:
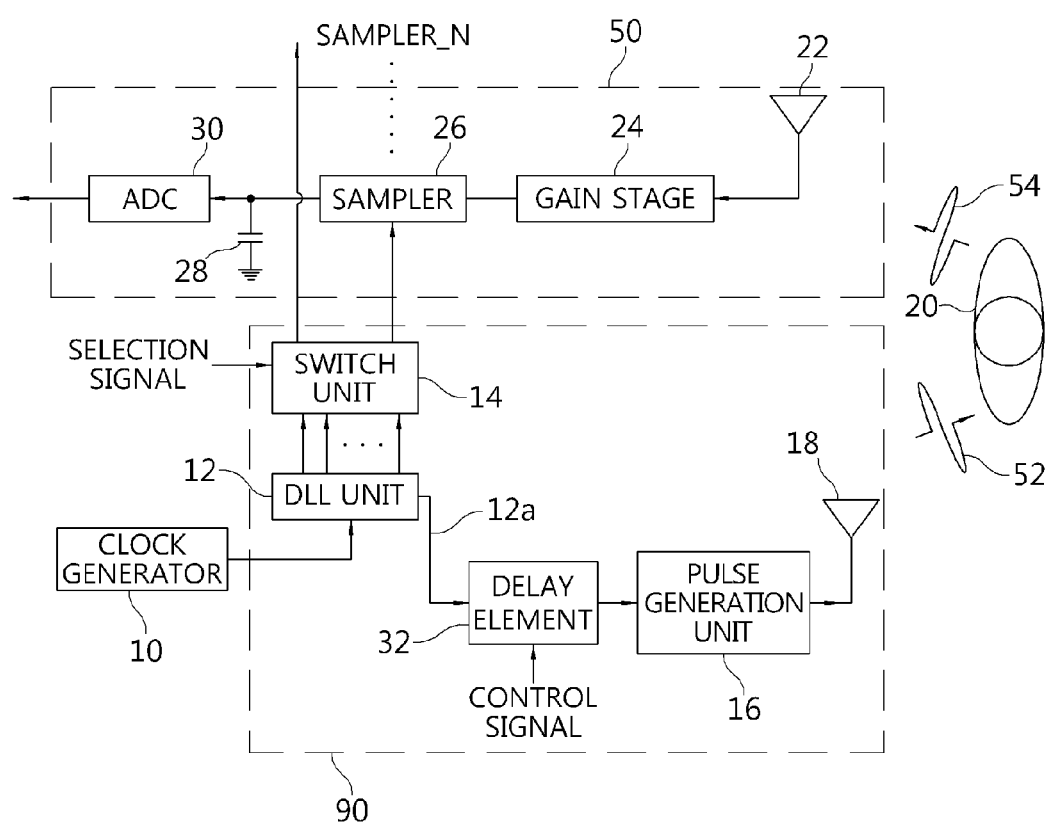
FIG. 6 is a diagram illustrating the configuration of a pulse radar apparatus according to a modified example of the present invention.

FIG. 6 is a diagram illustrating the configuration of a pulse radar apparatus according to a modified example of the present invention. The modified example of FIG. 6 is slightly different in its transmitter from the embodiment of FIG. 1.

The transmitter 90 of FIG. 6 differs from the transmitter 40 of FIG. 1 in that the transmitter 90 of FIG. 6 further includes a delay element 32 configured to fine delay a transmission trigger signal and send the delayed transmission trigger signal to the pulse generation unit 16. The delay element 32 configured to fine delay the transmission trigger signal further enhances the receiver resolution. If necessary, the delay element 32 may be installed to delay a sampling clock.

In other words, in the modified example of FIG. 6, the delay element 32 capable of controlling a transmission trigger signal minutely controls a point of time at which a transmission pulse is generated and the time delay of a point of time at which the sampling of the receiver 50 is performed, thereby increasing reception resolution. That is, the delay element 32 is controlled in response to a control signal in order to increase the resolution of the pulse radar apparatus of the present invention. In this case, in order to increase the resolution of the receiver, the delay element 32 controlled in response to the control signal may have a delay resolution higher than the minimum resolution of the DLL unit 12. In this case, the delay of the delay element 32 may be controlled so that it is lower than the minimum clock interval of the DLL unit 12.

In particular, the DLL unit has a multi-stage structure, and may select an appropriate clock in each stage and send the clock to its subsequent stage. A reception range may be selected by the combination of clocks selected by respective stages.

Using the DLL unit having a multi-stage structure, the number of required delay cells is reduced compared to that having a single stage structure, thereby simplifying its configuration. For example, if clocks obtained by equally dividing a pulse repetition frequency into 100 are used as the sampling clocks of the receiver, a single stage requires 100 delay cells. In contrast, in an embodiment of the present invention, 20 (10×10) delay cells are required. Furthermore, the structure of the switch unit configured select a clock is simplified and the delay characteristics of the switch unit are improved, thereby improving system performance. Furthermore, the switch of each stage may be easily controlled because the switch corresponds to a range interval.

In other words, in the embodiments of the present invention, some or all of echo signals are received from a plurality of echo signals using a transmission pulse trigger signal having a transmission pulse repetition frequency and a DLL clock selection signal defined by a user.

As described above, in accordance with an embodiment of the present invention, a sampling clock for a pulse receiver is generated and selected using a multi-stage DLL unit, so that the structure of a pulse radar apparatus having a high distance resolution is simplified, control is facilitated, and resolution and the SNR of an input signal are increased, thereby improving system performance.

The pulse radar apparatus of the present invention has a structure suitable for being implemented into an integrated circuit, thereby being capable of reducing the cost of a radar sensor. In particular, the present invention presents a new method that may be used to measure a minute motion within a short distance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pulse radar transmission apparatus of a radar system for transmitting a transmission pulse to a target, the radar system further including a pulse radar reception apparatus that receives the transmission pulse reflected by the target to obtain information of the target, the pulse radar transmission apparatus comprising:
 a synchronization unit configured
  to generate a transmission trigger signal having a transmission pulse repetition period, using an external reference clock, and
  to generate a plurality of clock signals respectively having different time delays with respect to the transmission trigger signal, using the external reference clock; and
 a pulse generation unit configured to generate, using the transmission trigger signal, the transmission pulse based on the transmission trigger signal having the transmission pulse repetition period; and
 a transmission antenna configured to send the transmission pulse to the target; and
 a switch unit configured
  to select one clock signal from the plurality of clock signals in response to an external selection signal for use as a sampling clock, and
  to provide the sampling clock to the pulse radar reception apparatus.

2. The pulse radar transmission apparatus of claim 1, wherein the synchronization unit generates the plurality of clock signals by dividing the transmission pulse repetition period at a certain time interval so that the plurality of clock signals each have the different time delay with respect to the transmission pulse trigger signal.

3. The pulse radar transmission apparatus of claim 1, wherein the synchronization unit comprises a Delay-Locked Loop (DLL) unit having a multi-stage structure in which two or more DLL circuits are connected.

4. The pulse radar transmission apparatus of claim 3, wherein the DLL circuits of the multi-stage structure are configured such that a preceding stage applies a plurality of clocks having a time interval to a subsequent stage and the subsequent stage outputs clocks by dividing the plurality of clocks.

5. The pulse radar transmission apparatus of claim 3, wherein each DLL circuit of the multi-stage structure is driven in response to a startup signal that is sequentially input to said each DLL circuit.

6. The pulse radar transmission apparatus of claim 3, wherein the DLL circuits of the multi-stage structure are configured such that the DLL circuit of a subsequent stage is driven in response to a signal indicating the DLL circuit of a preceding stage having been started up.

7. The pulse radar transmission apparatus of claim 1, further comprising a delay element configured to delay the transmission trigger signal and to send the delayed transmission trigger signal to the pulse generation unit, wherein the pulse generation unit generates the transmission pulse using the delayed transmission trigger signal.

8. A pulse radar reception apparatus of a radar system for receiving a transmission pulse reflected by a target to obtain information of the target, the radar system further including a pulse radar transmission apparatus that transmits the transmission pulse to the target, the pulse radar reception apparatus comprising:
a gain stage configured
to receive the transmission pulse reflected by the target as an echo signal, and
to amplify the echo signal;
a sampler having a hold device, the sampler being configured to receive a sampling clock that is generated by dividing a pulse repetition period by the pulse radar transmission apparatus, the holding device being configured to hold the echo signal using the sampling clock; and
an analog-to-digital converter configured to convert the held echo signal into a digital signal to output the digital signal.

9. The pulse radar reception apparatus of claim 8, wherein the plurality of clock signals respectively each have a different time delay with respect to the transmission pulse sent by the pulse radar transmission apparatus, the plurality of clock signals being generated by a synchronization unit including Delay-Locked Loop circuits.

10. The pulse radar reception apparatus of claim 8, wherein the gain stage comprises a low noise amplifier.

11. The pulse radar reception apparatus of claim 8, wherein the hold device comprises a capacitor.

12. The pulse radar transmission apparatus of claim 1, the switch unit provides the sampling clock to the pulse radar reception apparatus so that the pulse radar reception apparatus samples the transmission pulse reflected by the target, thereby to obtain the information of the target.

13. A radar system, comprising:
a pulse radar transmission apparatus including:
a synchronization unit configured
to generate a transmission trigger signal having a transmission pulse repetition period, using an external reference clock, and
to generate a plurality of clock signals respectively having different time delays with respect to the transmission trigger signal, using the external reference clock;
a pulse generation unit configured to generate, using the transmission trigger signal, a transmission pulse having a frequency corresponding to the transmission pulse repetition period;
a transmission antenna configured to send the transmission pulse to a target; and
a switch unit configured to select one clock signal from the plurality of clock signals in response to an external selection signal for use as a sampling clock; and
a pulse radar reception apparatus including:
a gain stage configured
to receive the transmission pulse reflected by the target as an echo signal, and
to amplify the echo signal;
a sampler having a hold device, the sampler being configured to receive the sampling clock sent from the synchronization unit of the pulse radar transmission apparatus, the holding device being configured to hold the echo signal using the sampling clock— and to store the held echo signal; and
an analog-to-digital converter configured to convert the held echo signal into a digital signal to output the digital signal, thereby to obtain information of the target from the held echo signal.

\* \* \* \* \*